(12) United States Patent
Lo

(10) Patent No.: US 7,619,975 B1
(45) Date of Patent: Nov. 17, 2009

(54) GENERALIZED AUTO MEDIA SELECTOR

(75) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 639 days.

(21) Appl. No.: 11/201,111

(22) Filed: Aug. 10, 2005

Related U.S. Application Data

(63) Continuation-in-part of application No. 10/435,301, filed on May 9, 2003, now Pat. No. 7,324,507, which is a continuation-in-part of application No. 09/991,046, filed on Nov. 21, 2001, now Pat. No. 7,054,309.

(60) Provisional application No. 60/667,731, filed on Apr. 1, 2005, provisional application No. 60/438,933, filed on Jan. 9, 2003.

(51) Int. Cl.
*G01R 31/08* (2006.01)

(52) U.S. Cl. ........................ 370/235; 370/360; 370/384; 370/469

(58) Field of Classification Search ................. 370/235, 370/360, 384, 469
See application file for complete search history.

(56) References Cited

U.S. PATENT DOCUMENTS 5,936,962 A * 8/1999 Haddock et al. ............ 370/446
6,154,464 A * 11/2000 Feuerstraeter et al. ....... 370/463
6,389,480 B1 * 5/2002 Kotzur et al. ............... 709/249
7,023,873 B2 * 4/2006 Gibson et al. ............... 370/445
2003/0179711 A1 * 9/2003 Huff ........................... 370/248
2003/0214979 A1 * 11/2003 Kang et al. .................. 370/535

OTHER PUBLICATIONS

ANSI/IEEE Std. 802.3, 2000 Edition; Part 3: Carrier Sense Multiple Access With Collision Detection (CSMA/CD) Access Method And Physical Layer Specifications, Parts 1, 2 & 3.
U.S. Appl. No. 11/114,842, Pending, William Lo.

* cited by examiner

*Primary Examiner*—Kevin C Harper
*Assistant Examiner*—Sai-Ming Chan

(57) ABSTRACT

A network media selection system comprises a memory that stores priority information for each of a plurality of ports and a media selector module that communicates with the memory, that receives activity signals and link signals from the plurality of ports, and that uses the activity signals, the link signals, and the priority information to generate enable signals for the plurality of ports. A respective port attempts to establish a link when a corresponding one of the enable signals is in a first state, and the respective port detects physical layer activity when a corresponding one of the enable signals is in a second state. The media selector module selectively sets enable signals to the second state for all of the plurality of ports other than a target port, which has the highest priority and has generated a link signal.

36 Claims, 5 Drawing Sheets

GENERALIZED AUTO MEDIA SELECTOR

CROSS-REFERENCE TO RELATED APPLICATIONS

This application is a continuation-in-part of U.S. patent application Ser. No. 10/435,301, filed on May 9, 2003, now U.S. Pat. No. 7,324,507 which is a continuation-in-part of U.S. patent application Ser. No. 09/991,046, filed Nov. 21, 2001 now U.S. Pat. No. 7,054,309 and claims the benefit of U.S. Provisional Application No. 60/438,933, filed on Jan. 9, 2003. This application claims the benefit of U.S. Provisional Application No. 60/667,731, filed on Apr. 1, 2005, which is hereby incorporated by reference herein in its entirety.

FIELD OF THE INVENTION

The present invention relates to computer networks, and more particularly to an automatic media selector.

BACKGROUND OF THE INVENTION

Referring now to FIG. 1, a data link layer 10 of the open systems interconnection (OSI) model includes a logical link control (LLC) layer 12 and a media access control (MAC) layer 14. The LLC layer 12 addresses and exchanges data with a network layer 16. The MAC layer 14 provides an interface between the LLC layer 12 and a physical layer device 18. The MAC layer 14 frames data for transmission over the network and then passes the frame to the physical layer device 18 for transmission as a stream of bits. In other words, the MAC layer 14 frames data into distinct units or packets that are transmitted one at a time over the network.

The physical layer device 18 typically includes a physical coding sublayer (PCS) 20, a physical medium attachment (PMA) sublayer 22, and an autonegotiation sublayer 24. A medium dependent interface (MDI) 26 connects the physical layer device 18 to media 28 such as twisted pair wires, optical fiber, or other media. The IEEE 802.3 specification, which is hereby incorporated by reference in its entirety, further defines how physical network interfaces operate with different types of media such as coaxial cable, twisted-pair cable, and optical fiber.

The autonegotiation sublayer 24 initiates the exchange of information between two connected network devices and automatically configures the devices to take maximum advantage of their respective abilities. The autonegotiation sublayer 24 advertises the abilities of the network device, acknowledges receipt, identifies common modes of operation, and rejects the use of operational modes that are not shared or supported by both devices. When more than one common mode of operation exists between the devices, an arbitration function of the autonegotiation layer 24 identifies and selects a single mode of operation. After autonegotiation is complete, the devices establish a link and exchange data.

To improve flexibility, the physical layer device 18 of some network devices has been designed to be connected to different types or speeds of media. Alternatively, multiple physical layer devices may be present to handle different types or speeds of media. The manufacturer and/or the user may not know a priori the types or speeds of media that will be used, and the media used may change over time.

SUMMARY OF THE INVENTION

A network media selection system comprises a memory that stores priority information for each of a plurality of ports and a media selector module that communicates with the memory, that receives activity signals and link signals from the plurality of ports, and that uses the activity signals, the link signals, and the priority information to generate enable signals for the plurality of ports. A respective port attempts to establish a link when a corresponding one of the enable signals is in a first state, and the respective port detects physical layer activity when a corresponding one of the enable signals is in a second state. The media selector module selectively sets enable signals to the second state for all of the plurality of ports other than a target port, which has the highest priority and has generated a link signal.

In other features, the priority information associates each of the plurality of ports with a unique priority level. The media selector module sets an enable signal for a senior port to the first state if the senior port has a higher priority than the target port and generates an activity signal. The media selector module sets enable signals to the second state for all of the plurality of ports other than the senior port and the target port when the senior port enable signal is in the first state. The media selector module sets enable signals to the second state for all of the plurality of ports other than the senior port when the senior port enable signal is in the first state.

In still other features, the media selector module sets enable signals to the first state for all of the plurality of ports a predetermined period after the senior port enable signal is set to the first state. The predetermined period is based upon a period required for a link to be established on physical media associated with the senior port, a period typically required for a link to be established on physical media associated with the senior port, and/or a maximum expected period required for a link to be established on physical media associated with the senior port.

In further features, the media selector module sets enable signals to the second state for all of the plurality of ports except for the target port when the media selector module receives a link signal from the target port. The media selector module sets enable signals to the second state for all of the plurality of ports except for the target port a predetermined period after receiving a link signal from the target port. The predetermined period is based upon a period required for a link to be established on physical media associated with one of the plurality of ports, upon a typical period required for a link to be established on physical media associated with a port corresponding to a highest priority level, and/or upon a maximum expected period required for a link to be established on physical media associated with a port corresponding to a highest priority level.

A physical layer device comprises the network media selection system and further comprises a plurality of ports that communicate with the media selector module and that each communicate with a physical media. Each of the plurality of ports monitors the physical media corresponding to the port for activity. Each of the plurality of ports attempts to establish a link over physical media corresponding to the port when a corresponding one of the enable signals is in a first state. Each of the plurality of ports operates in a low power mode when monitoring physical energy.

A network media selection system comprises memory means for storing priority information for each of a plurality of ports and media selecting means for communicating with the memory, receiving activity signals and link signals from the plurality of ports, and generating enable signals for the plurality of ports using the activity signals, the link signals, and the priority information, wherein a respective port attempts to establish a link when a corresponding one of the enable signals is in a first state, and the respective port detects physical layer activity when a corresponding one of the enable signals is in a second state, and wherein the media selecting means selectively sets enable signals to the second state for all of the plurality of ports other than a target port, which has the highest priority and has generated a link signal.

In other features, the priority information associates each of the plurality of ports with a unique priority level. The media selecting means sets an enable signal for a senior port to the first state if the senior port has a higher priority than the target port and generates an activity signal. The media selecting means sets enable signals to the second state for all of the plurality of ports other than the senior port and the target port when the senior port enable signal is in the first state. The media selecting means sets enable signals to the second state for all of the plurality of ports other than the senior port when the senior port enable signal is in the first state.

In still other features, the media selecting means sets enable signals to the first state for all of the plurality of ports a predetermined period after the senior port enable signal is set to the first state. The predetermined period is based upon a period required for a link to be established on physical media associated with the senior port, upon a period typically required for a link to be established on physical media associated with the senior port, and/or upon a maximum expected period required for a link to be established on physical media associated with the senior port. The media selecting means sets enable signals to the second state for all of the plurality of ports except for the target port when the media selecting means receives a link signal from the target port.

In other features, the media selecting means sets enable signals to the second state for all of the plurality of ports except for the target port a predetermined period after receiving a link signal from the target port, upon a period required for a link to be established on physical media associated with one of the plurality of ports, upon a typical period required for a link to be established on physical media associated with a port corresponding to a highest priority level, and/or upon a maximum expected period required for a link to be established on physical media associated with a port corresponding to a highest priority level.

A physical layer device comprises the network media selection system and further comprises a plurality of ports that communicate with the media selecting means and that each communicate with a physical media. Each of the plurality of ports monitors the physical media corresponding to the port for activity. Each of the plurality of ports attempts to establish a link over physical media corresponding to the port when a corresponding one of the enable signals is in a first state. Each of the plurality of ports operates in a low power mode when monitoring physical energy.

In still other features, the methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided after. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
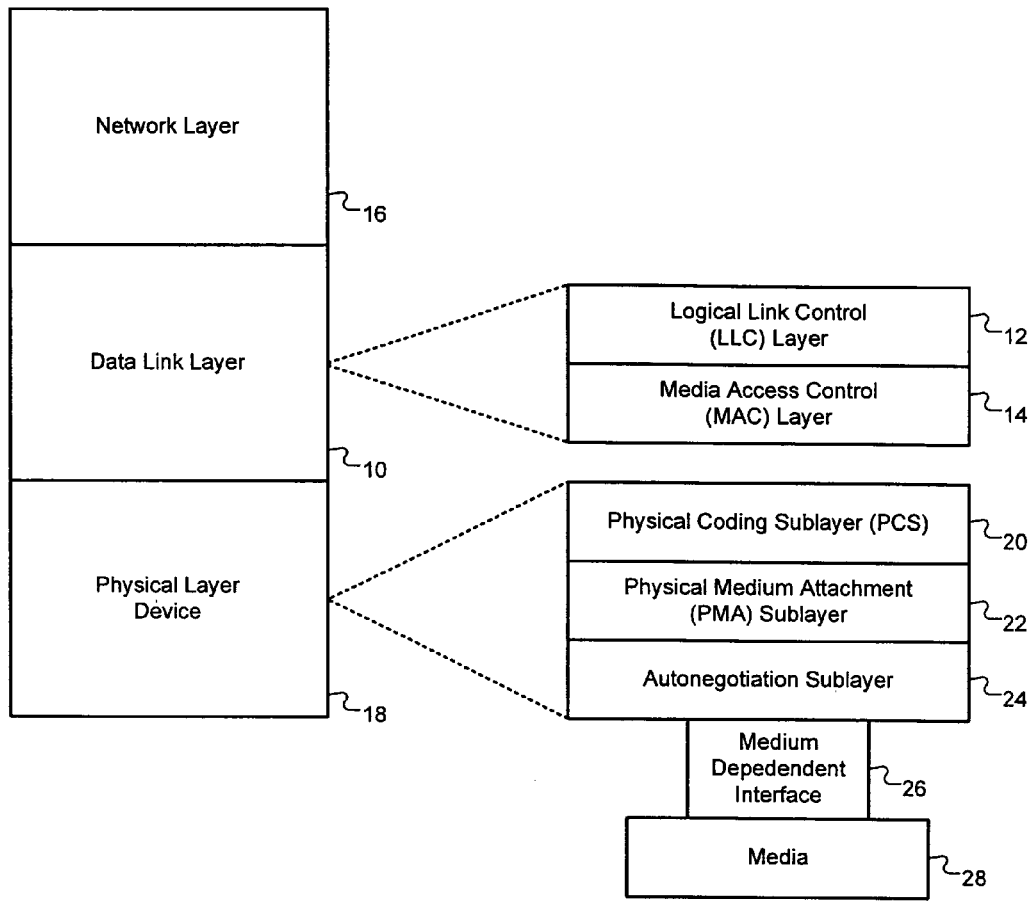
FIG. 1 is a diagram of the open systems interconnection (OSI) model.

The following description of the preferred embodiments is merely exemplary in nature and is in no way intended to limit the invention, its application, or uses. For purposes of clarity, the same reference numbers will be used in the drawings to identify similar elements. As used, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2:
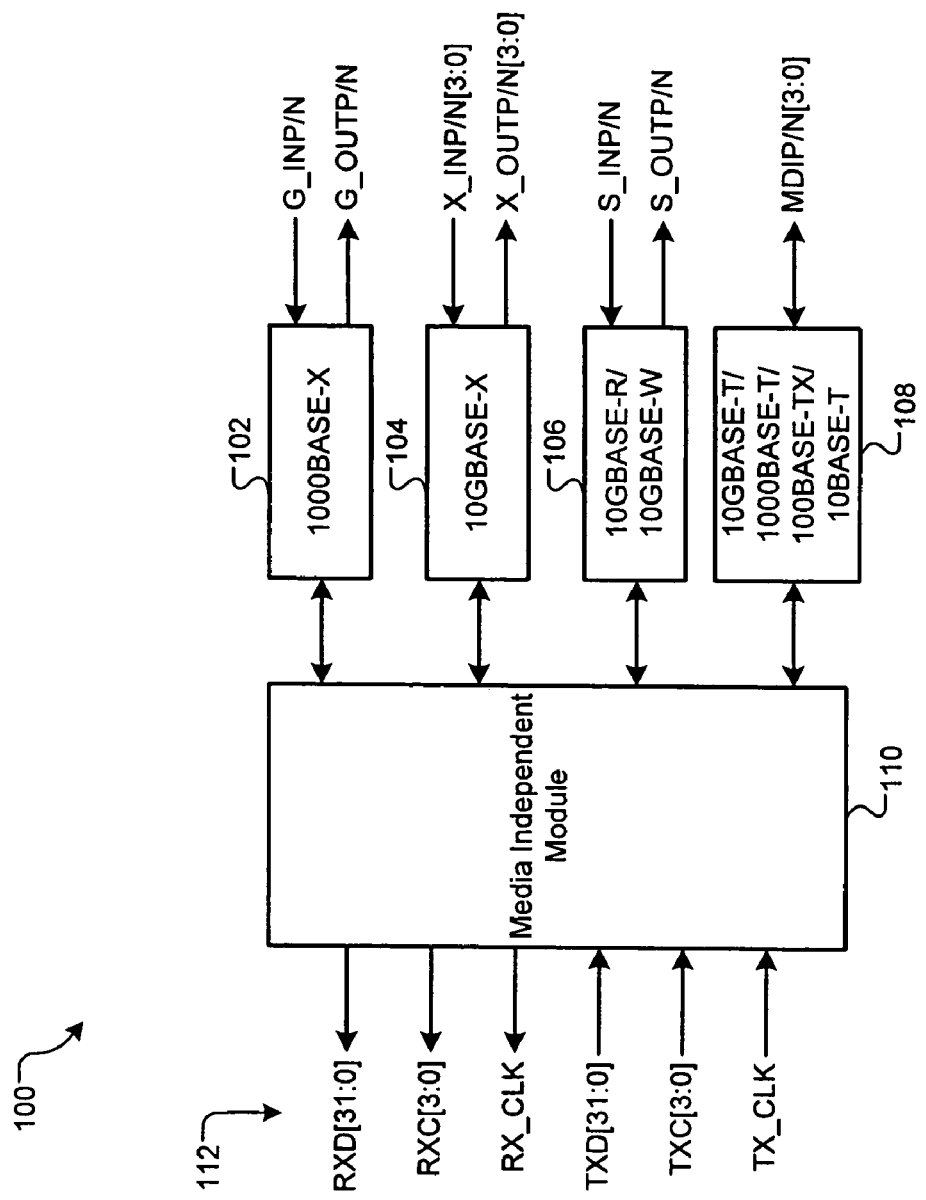
FIG. 2 is a functional block diagram of an exemplary physical layer device (PHY)

Referring now to FIG. 2, an exemplary physical layer device (PHY) 100 is depicted. The exemplary PHY 100 includes N media ports. In this implementation, N is equal to four. The N ports include a fiber 1000BASE-X first port 102, a parallel 10GBASE-X second port 104, a LAN/WAN serial 10GBASE-R/10GBASE-W third port 106, and a copper 10GBASE-T/1000BASE-T/100BASE-TX/10BASE-T fourth port 108. One skilled in the art will recognize that a PHY may have additional or fewer media ports, and the media ports may be of different type.

The media ports 102, 104, 106, and 108 communicate with a media independent module 110. The media independent module 110 provides a media independent interface 112, such as with XGMII/GMII/MII signals, as shown in the exemplary PHY 100. Alternatively, the interface may be a XAUI interface, or an extended XGMII interface, disclosed in "Media And Speed Independent Interface," U.S. patent application Ser. No. 11/114,842, filed Apr. 26, 2005, which is hereby incorporated by reference in its entirety.

Each of the media ports is able to sense when there is energy (or activity) on its physical media. The first media port 102 is shown receiving signal G_INP/N and transmitting G_OUTP/N. The second media port 104 is shown receiving signals X_INP/N[3:0] and transmitting X_OUTP/N[3:0]. The third media port 106 is shown receiving signal S_INP/N and transmitting S_OUTP/N. The fourth media port 108 is shown communicating signals MDIP/N[3:0]. These signals are media and implementation dependent. As described below, the media independent module 110 chooses one media port to connect with the media independent interface 112.

Each of the media ports is capable of sensing whether there is activity (or energy) on its physical medium. This information is communicated to the media independent module 110 in the form of activity signals. Each of the media ports also communicates its network link status to the media independent module 110 in the form of link signals. One skilled in the art will recognize that the activity and link signals may be multiplexed over the same physical connection.

Figure 3:
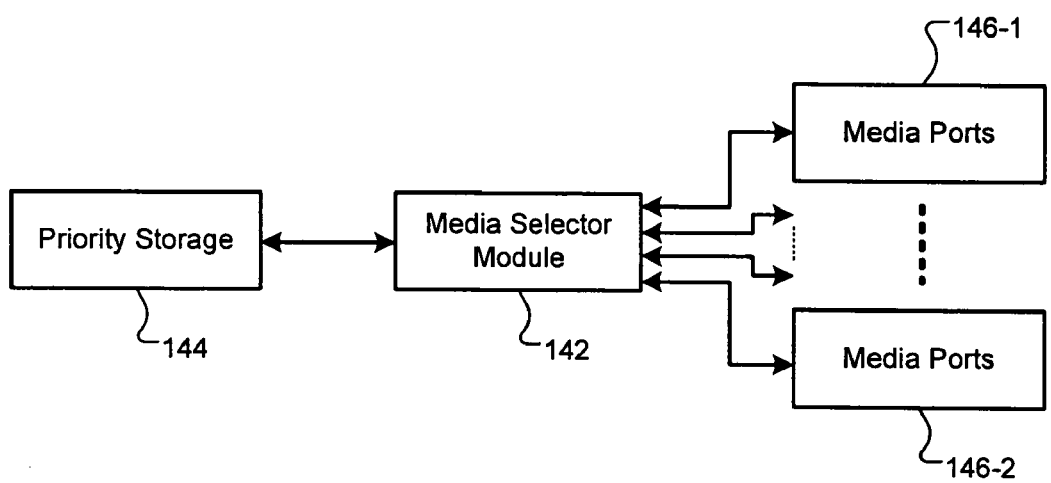
FIG. 3 is a functional block diagram of an exemplary media selection system for a PHY.

Referring now to FIG. 3, a functional block diagram of an exemplary media selection system for a PHY is presented. A media selector module 142 communicates with a priority storage module 144. The media selector module 142 communicates with at least two media ports 146. The priority storage module 144 contains information regarding priority of the media ports 146, i.e., which media port is preferred with respect to other media port for establishing a connection. The priority information assigns a distinct priority to each media port 146, such that a list can be formed with the highest priority media port at the top and the lowest priority media port at the bottom. The media selector module 142 uses the priority information to maintain a link on the highest priority media port 146 that is possible. This priority information may be default or pre-programmed values, or may be set by the end user.

Figure 4:
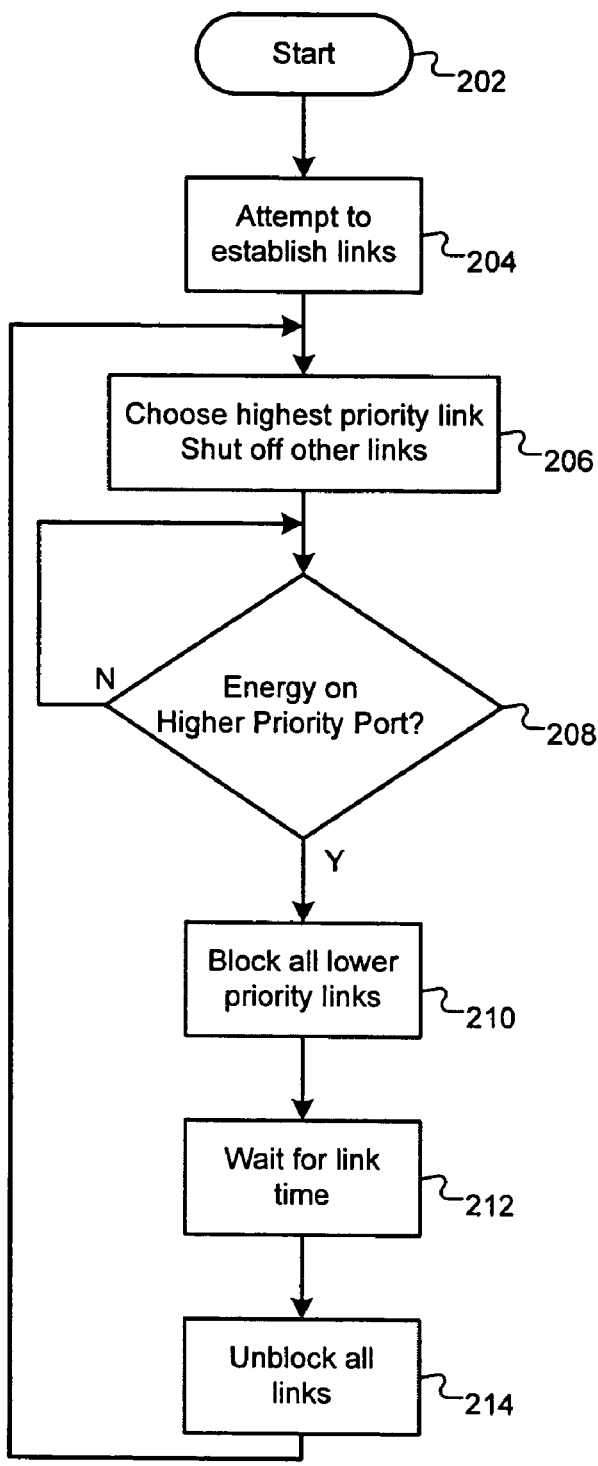
FIG. 4 is a flow chart depicting exemplary steps performed by a media selection system according to the principles of the present invention.

Referring now to FIG. 4, a flow chart depicts exemplary steps taken by the media selector module 142 in determining which media port will be selected. Control starts at step 202 and transfers to step 204. In step 204, control attempts to establish links on all of the media ports. Control then transfers to step 206, where the established link of the highest priority port is chosen and all other links are blocked. Blocked links operate in a minimal power mode, with only a low-power circuit to detect energy on the physical media. Control then transfers to step 208. In step 208, control determines whether energy is sensed on a higher priority port. If so, control transfers to step 210; otherwise, control remains in step 208.

In step 210, ports with a priority below the higher priority port of step 208 are blocked. Optionally, the lower priority port on which a link is currently established can remain on, pending a link being established on the higher priority port of step 208. Power constraints of the PHY 18 may only allow for one link at a time, in which case all lower priority ports will be blocked. In step 212, a timer is set, and upon expiration of the timer, control transfers to step 214. The timer value is set based on the time typically (or alternately, maximally) required for the media of the higher priority port of step 208 to establish a link. In step 214, all links are unblocked and control returns to step 206.

Figure 5:
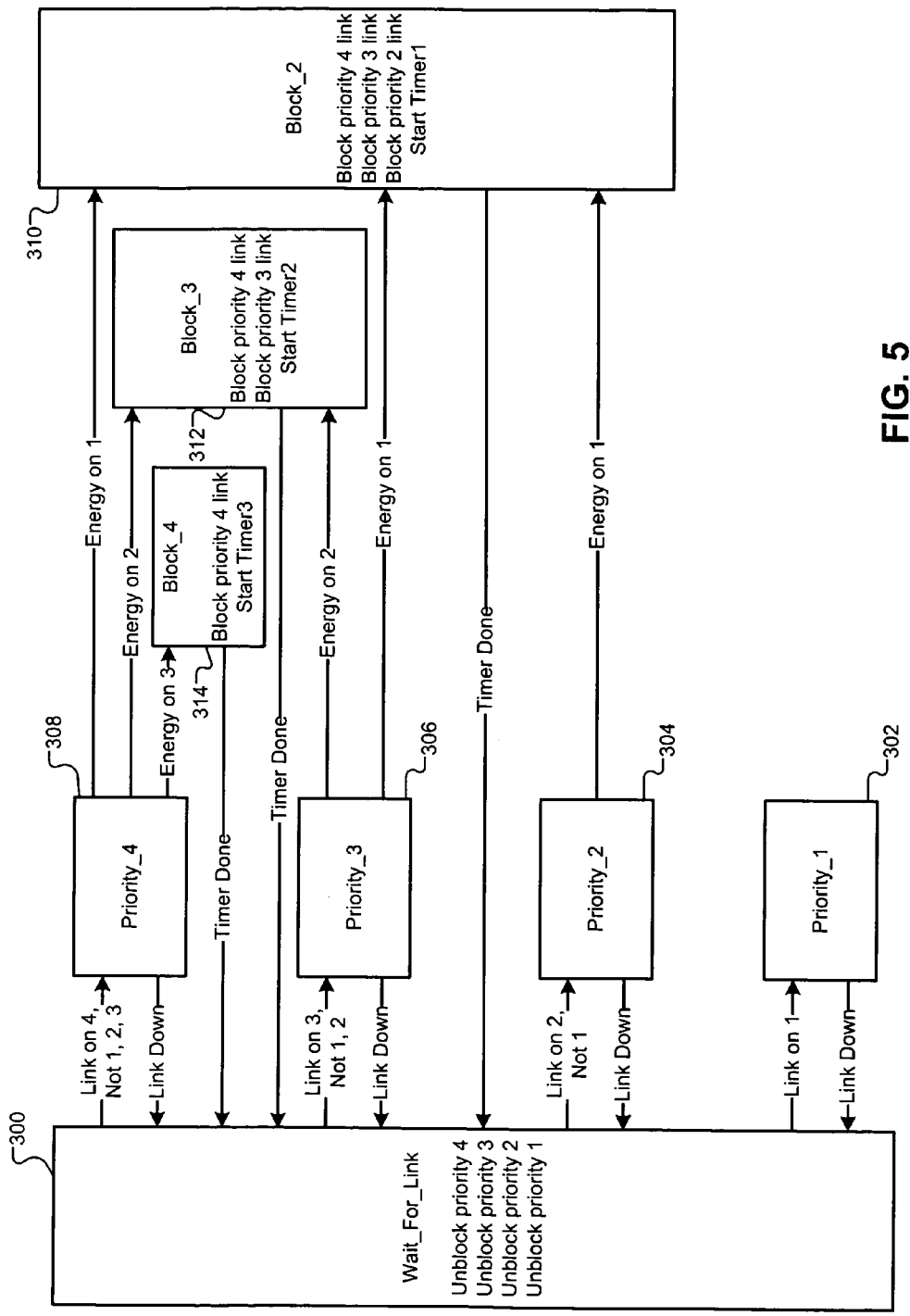
FIG. 5 is an exemplary state diagram of a media selection system according to the principles of the present invention.

Referring now to FIG. 5, a state diagram of an exemplary media selection system according to the principles of the present invention is presented. In this exemplary media selection system, four media ports and therefore four corresponding priority levels are present. Each media port is assigned a distinct priority level. The media port with the highest priority (the most preferable network link) is referred to as port one, the media port with the second highest priority is port two, etc. One skilled in the art will recognize that more or fewer ports may be employed. Control begins in state 300, where all four ports are unblocked and each attempts to establish a link. If a link is established on port one, control transfers to state 302. If no link is established on port one, but a link is established on port two, control transfers to state 304; otherwise, if a link is established on port three, control transfers to state 306; otherwise, if a link is established on port four, control transfers to state 308.

In state 302 ports two through four are blocked. If the established link goes down, control returns to state 300. In state 304 ports one, three, and four are blocked. If the established link goes down, control returns to state 300. If, in state 304, energy is sensed on port one, control transfers to state 310. In state 310 ports two, three, and four are blocked and a timer is started. The timer value is based on the typical (or optionally, maximum expected) time required for a link to be established on the physical media used by port one. When the timer is done, control transfers to state 300. This timed delay gives the (preferred) port one a head start in establishing a link.

In state 306 ports one, two, and four are blocked. If the established link goes down, control returns to state 300. If, in state 306, energy is sensed on port one, control transfers to state 310. Otherwise, if energy is sensed on port two, control transfers to state 312. In state 312 ports three and four are blocked and a timer is started with a value corresponding to port two. When the timer is done, control returns to state 300.

In state 308 ports one through three are blocked. If the established link goes down, control returns to state 300. If energy is sensed on port one, control transfers to state 310. Otherwise, if energy is sensed on port two, control transfers to state 312; otherwise, if energy is sensed on port three, control transfers to state 314. In state 314 port four is blocked and a timer is started with a value corresponding to port three. When the timer is done, control returns to state 300. Selective blocking depends upon power requirements. If the physical layer device can support the power draw of multiple simultaneous links, the port with a currently active link may remain unblocked until the higher priority port has actually established a link.

One skilled in the art will recognize that there are various methods of detecting and qualifying energy. A partial discussion of how to detect energy on physical media is presented in "Ethernet Automatic Media Selection Logic," U.S. patent application Ser. No. 09/991,046, filed Nov. 21, 2001, and "Ethernet Automatic Media Selection Logic With Preferred Medium Selector," U.S. patent application Ser. No. 10/435,301, filed May 9, 2003, which are both hereby incorporated by reference in their entirety.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A network media selection system comprising:
   memory that stores priority information for each of a plurality of ports; and
   a media selector module that communicates with said memory, that receives activity signals and link signals from the plurality of ports, and that uses said activity signals, said link signals, and said priority information to generate enable signals for the plurality of ports,
   wherein a respective port attempts to establish a link when a corresponding one of said enable signals is in a first state and generates said link signal when said link is established, and said respective port detects physical layer activity when a corresponding one of said enable signals is in a second state and generates said activity signal when said physical layer activity is detected,
   and wherein said media selector module selectively sets said enable signals to said second state for all of the plurality of ports other than a target port, which has the highest priority and has generated a link signal.

2. The system of claim 1 wherein said priority information associates each of the plurality of ports with a unique priority level.

3. The system of claim 1 wherein said media selector module sets an enable signal for a senior port to said first state if the senior port has a higher priority than the target port and generates an activity signal.

4. The system of claim 3 wherein said media selector module sets enable signals to said second state for all of the plurality of ports other than the senior port and the target port when said senior port enable signal is in said first state.

5. The system of claim 3 wherein said media selector module sets enable signals to said second state for all of the plurality of ports other than the senior port when said senior port enable signal is in said first state.

6. The system of claim 3 wherein said media selector module sets enable signals to said first state for all of the plurality of ports a predetermined period after said senior port enable signal is set to said first state.

7. The system of claim 6 wherein said predetermined period is based upon a period required for a link to be established on physical media associated with the senior port.

8. The system of claim 7 wherein said predetermined period is based upon a period typically required for a link to be established on physical media associated with the senior port.

9. The system of claim 7 wherein said predetermined period is based upon a maximum expected period required for a link to be established on physical media associated with the senior port.

10. The system of claim 1 wherein said media selector module sets enable signals to said second state for all of the plurality of ports except for the target port when said media selector module receives a link signal from the target port.

11. The system of claim 1 wherein said media selector module sets enable signals to said second state for all of the plurality of ports except for the target port a predetermined period after receiving a link signal from the target port.

12. The system of claim 11 wherein said predetermined period is based upon a period required for a link to be established on physical media associated with one of the plurality of ports.

13. The system of claim 12 wherein said predetermined period is based upon a typical period required for a link to be established on physical media associated with a port corresponding to a highest priority level.

14. The system of claim 12 wherein said predetermined period is based upon a maximum expected period required for a link to be established on physical media associated with a port corresponding to a highest priority level.

15. A physical layer device comprising the system of claim 1 and further comprising:
a plurality of ports that communicate with said media selector module and that each communicate with a physical media.

16. The physical layer device of claim 15 wherein each of said plurality of ports monitors said physical media corresponding to said port for activity.

17. The physical layer device of claim 15 wherein each of said plurality of ports attempts to establish a link over physical media corresponding to said port when a corresponding one of said enable signals is in a first state.

18. The physical layer device of claim 15 wherein each of said plurality of ports operates in a low power mode when monitoring physical energy.

19. A method for selecting network media comprising:
storing priority information for each of a plurality of ports;
receiving activity signals and link signals from the plurality of ports;
generating enable signals for the plurality of ports using said activity signals, said link signals, and said priority information, wherein a respective port attempts to establish a link when a corresponding one of said enable signals is in a first state and generates said link signal when said link is established, and said respective port detects physical layer activity when a corresponding one of said enable signals is in a second state and generates said activity signal when said physical layer activity is detected; and
selectively setting said enable signals to said second state for all of the plurality of ports other than a target port, which has the highest priority and has generated a link signal.

20. The method of claim 19 wherein said priority information associates each of the plurality of ports with a unique priority level.

21. The method of claim 19 further comprising setting an enable signal for a senior port to said first state if the senior port has a higher priority than the target port and generates an activity signal.

22. The method of claim 21 further comprising setting enable signals to said second state for all of the plurality of ports other than the senior port and the target port when said senior port enable signal is in said first state.

23. The method of claim 21 further comprising setting enable signals to said second state for all of the plurality of ports other than the senior port when said senior port enable signal is in said first state.

24. The method of claim 21 further comprising setting enable signals to said first state for all of the plurality of ports a predetermined period after said senior port enable signal is set to said first state.

25. The method of claim 24 wherein said predetermined period is based upon a period required for a link to be established on physical media associated with the senior port.

26. The method of claim 25 wherein said predetermined period is based upon a period typically required for a link to be established on physical media associated with the senior port.

27. The method of claim 25 wherein said predetermined period is based upon a maximum expected period required for a link to be established on physical media associated with the senior port.

28. The method of claim 19 further comprising setting enable signals to said second state for all of the plurality of ports except for the target port when a link signal from the target port is received.

29. The method of claim 19 further comprising setting enable signals to said second state for all of the plurality of ports except for the target port a predetermined period after receiving a link signal from the target port.

30. The method of claim 29 wherein said predetermined period is based upon a period required for a link to be established on physical media associated with one of the plurality of ports.

31. The method of claim 30 wherein said predetermined period is based upon a typical period required for a link to be established on physical media associated with a port corresponding to a highest priority level.

32. The method of claim 30 wherein said predetermined period is based upon a maximum expected period required for a link to be established on physical media associated with a port corresponding to a highest priority level.

33. The method of claim 19 further comprising monitoring physical media associated with each of the plurality of ports for activity.

34. The method of claim 19 further comprising operating the plurality of ports in a low power mode when corresponding enable signals are in said second state.

35. The system of claim 1 wherein the plurality of ports comprises more than two ports.

36. The method of claim 19 wherein the plurality of ports comprises more than two ports.

* * * * *